(12) United States Patent
Yeh

(10) Patent No.: US 7,828,619 B1
(45) Date of Patent: Nov. 9, 2010

(54) METHOD FOR PREPARING A NANOSTRUCTURED COMPOSITE ELECTRODE THROUGH ELECTROPHORETIC DEPOSITION AND A PRODUCT PREPARED THEREBY

(75) Inventor: Kwang "Jeff" Yeh, Davis, CA (US)

(73) Assignee: Mytitek, Inc., Davis, CA (US)

( * ) Notice: Subject to any disclaimer, the term of this patent is extended or adjusted under 35 U.S.C. 154(b) by 1074 days.

(21) Appl. No.: 11/484,083

(22) Filed: Jul. 10, 2006

Related U.S. Application Data

(60) Provisional application No. 60/706,059, filed on Aug. 5, 2005.

(51) Int. Cl.
*H01J 9/00* (2006.01)
(52) U.S. Cl. .......................... 445/49; 445/51
(58) Field of Classification Search ......... 313/495–497, 313/309, 336, 351, 355; 445/23–25, 50, 445/51
See application file for complete search history.

(56) References Cited

U.S. PATENT DOCUMENTS

| | | | |
|---|---|---|---|
| 5,338,430 A | * | 8/1994 | Parsonage et al. ........... 204/412 |
| 6,395,427 B1 | | 5/2002 | Sheme et al. |
| 6,616,875 B2 | | 9/2003 | Lee et al. |
| 6,703,163 B2 | | 3/2004 | Ogura et al. |
| 7,252,749 B2 | | 8/2007 | Zhou et al. |
| 2006/0217025 A1 | | 9/2006 | Hsiao et al. |

FOREIGN PATENT DOCUMENTS

TW     I280991     5/2007

* cited by examiner

*Primary Examiner*—Joseph L Williams
(74) *Attorney, Agent, or Firm*—Patrick J. S. Inouye

(57) ABSTRACT

A method for preparing a nanostructured composite electrode through electrophoretic deposition and a product prepared thereby are presented. A conductive material and an active material are suspended into a stable suspension in solution by ultrasonication. The conductive material includes functionalized carbon multi-walled nanotubes. The active material includes synthesized nanoparticles. A surface charge is applied to the active material by adding an electrolyte into the stable suspension. At least two electrodes are introduced into the stable suspension in opposing parallel orientation. A direct current electrical field is formed between the electrodes sufficient to cause conductive material and the active material formation thereupon.

22 Claims, 3 Drawing Sheets

10

20

30

40

50

60

70

80

90

100

METHOD FOR PREPARING A NANOSTRUCTURED COMPOSITE ELECTRODE THROUGH ELECTROPHORETIC DEPOSITION AND A PRODUCT PREPARED THEREBY

CROSS-REFERENCE TO RELATED APPLICATION

This non-provisional patent application claims priority under 35 USC §119(e) to U.S. provisional patent application Ser. No. 60/706,059, filed Aug. 5, 2005, the disclosure of which is incorporated by reference.

FIELD OF THE INVENTION

The invention relates in general to nanostructured composite electrode preparation and, in particular, to a method for preparing a nanostructured composite electrode through electrochemical deposition techniques, such as electrophoretic deposition (EPD), electrolytic deposition (ELD), and electroplating, and a product prepared thereby.

BACKGROUND OF THE INVENTION

Electrochemical energy storage or generation devices include batteries, capacitors and ultracapacitors, and fuel cells. Batteries are characterized by rated capacity measured by ampere-hours that can be delivered. Capacitors and ultracapacitors are characterized by the energy or power density that can be delivered in a single discharge, which is the ratio of cell energy or power to weight or volume.

All energy storage or generation devices include a pair of electrodes and an electrolyte that is disposed between the electrodes to conduct an electric current. Electrodes are electrical conductors at the surface of which a change occurs from conduction by electrons to conduction by ions. A cathode electrode contains an active material that is reduced during discharge, whereas an anode electrode contains an active material that is oxidized during discharge. Conventional electrodes, particularly cathodes, are characterized by low electrical conductivity, dependent upon the type of device and materials used. For instance, transition metal-based lithium oxide electrodes for lithium-ion batteries and amorphous transition metal-based oxide electrodes for ultracapacitors both suffer from low cathode conductivity.

To compensate for low electrode conductivity, conductive fillers, such as carbon, are frequently added to the matrix to improve the conductivity. The requirement for and the amount of carbon filler can depend on the specific oxide used and the volume of filler can be as high as forty to fifty percent of the overall cathode mixture, dependent upon relative carbon density and other cathode components. Carbon fillers also require a binder, which can further reduce the conductivity and thus decrease the specific energy of the storage device.

As the filler concentration increases, the carbon particles can clump and aggregate and uniform dispersion becomes problematic. Non-uniform dispersion can compromise both electrode performance and lifetime by decreasing the percentage of contact surface area exposed to the electrolyte. As a result, existing approaches to improving energy storage device performance generally focus on electrode construction.

U.S. Pat. No. 6,616,875 to Lee et al., issued Sep. 9, 2003, discloses a manufacturing method for a metal oxide electrode for an ultracapacitor. An amorphous manganese oxide electrode is formed by absorbing potassium permanganate onto a conductive material, such as carbon or activated carbon, and is mixed with a solution to form amorphous manganese oxide. Conductive carbon is used as the active material and requires a binder to compensate for the low electrical conductivity of the manganese oxide.

U.S. Pat. No. 6,703,163 to Ogura et al., issued Mar. 9, 2004, discloses a lithium battery and electrode. A plurality of carbon nanotubes are dispersed in a conductive matrix containing an electrically conductive polymer and an organic compound having a disulfide group that is responsible for electrochemical reactions at the electrode. The carbon nanotubes conduct electricity along an axial direction of the matrix to decrease electrical resistance and improve conductivity over the electrically conductive polymer. However, the carbon nanotubes also function as a filler and require a binder.

U.S. Pat. No. 6,395,427 to Sheme et al., issued May 28, 2002, discloses a negative active material for and a method of preparing a rechargeable lithium battery. The negative active material includes a crystalline carbon core and a semi-crystalline carbon shell. Amorphous or crystalline carbon is mixed into a catalyst element and agglomerated to form carbon core particles that can provide micro-porous channels to improved electrolyte immersion. However, the carbon core particles function as a filler and can suffer from non-uniform diffusion.

Accordingly, there is a need for preparing and providing an energy storage device electrode with increased electrical conductivity and improved power density without relying on carbon with a binder in the matrix.

SUMMARY OF THE INVENTION

A composite electrode includes nanosized particles that are assembled on the surface of carbon nanotubes through electrochemical techniques that include electrophoretic deposition (EPD), electrolytic deposition (ELD), and direct deposition. The resulting electrode features ordered structure with high porosity, which improves energy storage or generation device performance by enabling faster and uniform diffusion and improved reaction routes via the carbon nanotubes. The electrode can be used for lithium-ion batteries, ultracapacitors and fuel cells, as well as other energy storage or generation devices.

One embodiment provides a method for preparing a nanostructured composite electrode through electrophoretic deposition and a product prepared thereby. A conductive material and an active material are suspended into a stable suspension in solution by ultrasonication. The conductive material includes functionalized carbon multi-walled nanotubes. The active material includes synthesized nanoparticles. A surface charge is applied to the active material by adding an electrolyte into the stable suspension. At least two electrodes, are introduced into the stable suspension in parallel orientation. A direct current electrical field is formed between the electrodes sufficient to cause conductive material and the active material formation thereupon.

A further embodiment provides a method for preparing a nanostructured composite electrode through direct deposition and a product prepared thereby. A conductive material, including functionalized carbon multi-walled nanotubes, and an active material, are suspended into a colloidal suspension in manganese salt-containing solvent by ultrasonication. A layer of the colloidal suspension is directly deposited on at least one electrode, including a conductive metal foil, followed by drying. The electrode is annealed to decompose the colloidal suspension into an amorphous deposit, including synthesized nanoparticles.

A still further embodiment provides a method for preparing a nanostructured composite electrode through combined electrophoretic and electrolyte deposition and a product prepared thereby. A conductive material, including functionalized carbon multi-walled nanotubes, is suspended into a stable suspension in ethanol by ultrasonication. An electrolyte, including a metal salt, is added into the stable suspension. Two electrodes, including a conductive metal foil as electrode, is introduced into the stable suspension in parallel orientation. A direct current electrical field is formed between the electrodes sufficient to cause conductive material and the active material formation thereupon.

The nanoparticles in the composite electrodes are deposited on the nanotubes to form an ordered nanostructure, which provides an effective conduction network. Additionally, highly conductive nanotubes with high aspect ratios can be used as conducting additives to form efficient conductive paths, even in low volume, to enable fast charge and discharge with low capacity loss. Similarly, the high aspect ratio and entanglement of carbon nanotubes significantly increase electrode porosity. Electrolyte ion access to the composite active mass becomes favored, while maintaining the improved electrical conductivity provided by the carbon nanotubes. Thus, battery electrode capacity and capacitor or ultracapacitor electrode capacitance are significantly improved.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Carbon nanotubes (CNTs) are characterized by high electrical conductivity, chemical stability, low mass density, and large surface area. CNTs typically have aspect ratios greater than 1000 and require a lower percolation threshold when used as conductive fillers. Only a relatively low volume fraction of CNTs in the electrode are needed to form an effective conductive path network to enable faster charge and discharge with low capacity loss. Battery rate capability and capacitor power density can thus be improved.

Figure 1:
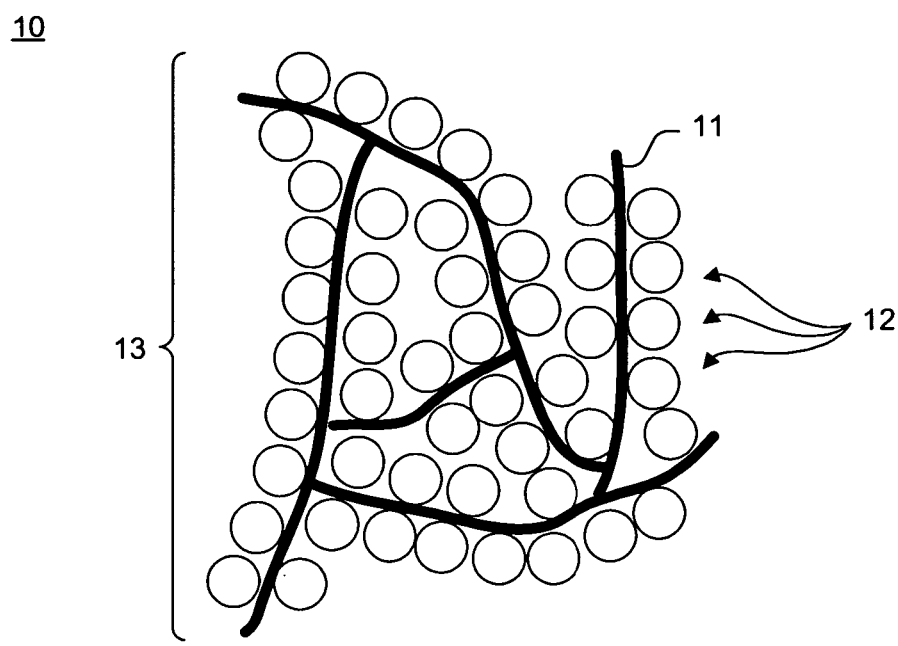
FIG. 1 is a functional diagram showing, by way of example, a conductive path network formed by entangled nanotubes and attracted nanoparticles.

FIG. 1 is a functional diagram 10 showing, by way of example, a conductive path network 13 formed by entangled nanotubes 11 and attracted nanoparticles 12. For clarity, the relative sizes and placements of the nanotubes 11 and nanoparticles 12 are exaggerated. Forming a composite electrode with high specific surface area CNTs significantly increases the electrode porosity due to a high aspect ratio and the entanglement of CNTs. Ions accessibility from the electrolyte to the active mass of the composite is favorable due to the open electrode network and electrical conductivity provided by the CNTs. In a composite electrode with an ordered structure, the nanoparticles attach to the surfaces of the CNTs. Thus, the function of nanotubes as conductors is fully exerted and highly effective conducting paths are obtained. As a consequence, electrode capacity for capacitors and batteries and electrode capacitance for capacitors and ultracapacitors is significantly improved. Finally, the film formed using this technique provides flexibility and entanglement of CNTs ensure good composite electrode mechanical properties.

In one embodiment, a highly conductive multi-walled carbon nanotube (MWNTs) electrode is prepared via EPD to form a thin film electrode on a conductive metal foil, for example, nickel, aluminum, or copper foil, which can be used as a current collector. This electrode can be used as an electrode in battery, ultracapacitor, or fuel cell applications. This thin film electrode can also be used as the base electrode in state of the art battery to enhance performance.

In one embodiment, a composite electrode is prepared that includes highly conductive multi-walled carbon nanotubes (MWNTs) as conductive filler and nanosized particles as an active element. The nanosized particles are assembled on the surfaces of the nanotubes via EPD, ELD, or direct deposition to form a thin film composite electrode on a conductive metal foil, for example, nickel, aluminum, or copper foil, which can be used as a current collector. The nanoparticles can be composed of $LiCoO_2$, $LiMnO_2$, $LiNiO_2$, $Li_xMn_{1-y}Ni_yO_2$ for lithium-ion batteries; amorphous $MnO_2$ or $RuO_2$ for ultracapacitors; and Pt or Ru for fuel cells.

Figure 2:
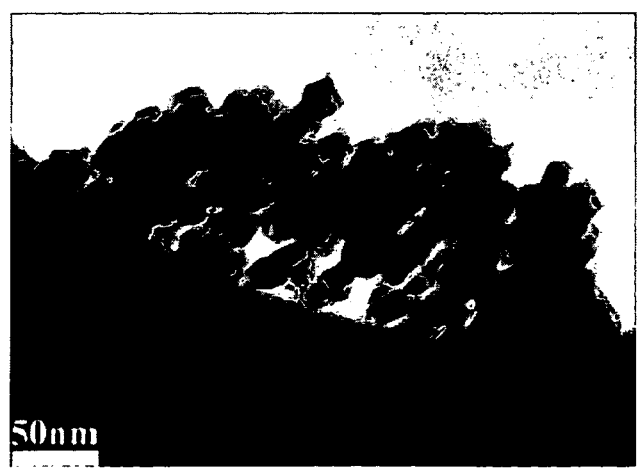
FIG. 2 is a TEM image showing nanoparticles composed of $LiCoO_2$.

The nanoparticles are produced by low temperature synthesis. As an example, to synthesize $LiCoO_2$ nanoparticles, lithium nitrate and cobalt are dissolved in distilled water with citrate acid, which is used as fuel for combustion synthesis. The solution is placed on a hot plate to evaporate the water and auto-ignited to form a loose powder through combination. FIG. 2 is a TEM image 20 showing nanoparticles composed of $LiCoO_2$. The TEM image 20 is scaled to 50 nm. As shown with reference to the TEM image 20, the size of $LiCoO_2$ nanoparticles is around 20-30 nm after annealing at 500° C. for three hours. Other methods for producing nanoparticles are possible.

Example 1

Electrophoretic deposition (EPD) is a colloidal process. Raw materials are shaped directly from a stable suspension via motion of charged particles, which are dispersed in a liquid towards an electrode under a direct current electric field. CNTs and nanoparticles coagulate to form deposits on the electrode.

In one embodiment, charged CNTs and nanoparticles are separated in solution from sediment through upward deposition. Two conductive metal foils, for example, copper foils, are introduced into the stable suspension in parallel orientation with one of the metal foils preferably superposed above the other match foil. The metal foils are connected to a direct current power source and used as EPD electrodes.

Stable suspensions with varied concentrations of carbon nanotubes can be prepared. To prepare the stable suspension, a predetermined amount of refluxed functionalized CNTs, $LiCoO_2$ nanoparticles, and an electrolyte, such as $Mg(NO_3)_2$ or equivalent nitrates, are placed in a beaker containing ethanol as a solvent. The solution is sonicated for about 30 minutes. In a typical experiment, 15 mg of functionalized MWNTs are dispersed in 200 ml of ethanol by ultrasonication. To create a surface charge on the MWNTs, $10^{-5}$~$10^{-4}$ mol of $Mg(NO_3)_2$ is added into the stable suspension as an electrolyte. Once the stable suspension is available, a direct current of approximately 20-45 Volts is applied to the electrodes. The optimum current is approximately 60-80 mAmps.

Figure 3:
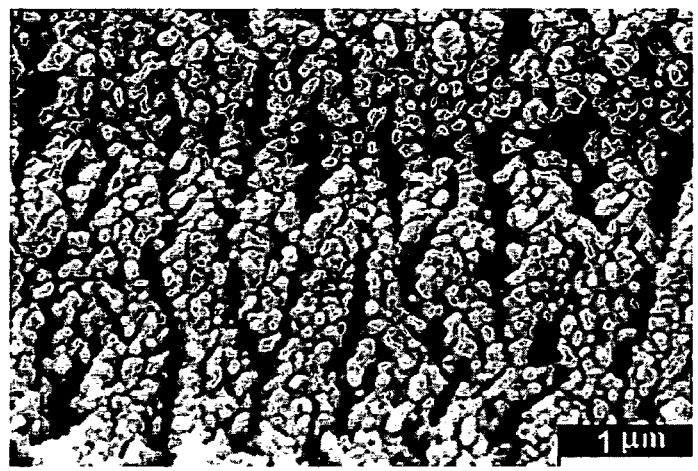
FIGS. 3 and 4 are TEM images showing the nanostructures of the composite electrodes prepared through EPD or ELD.
Figure 4:
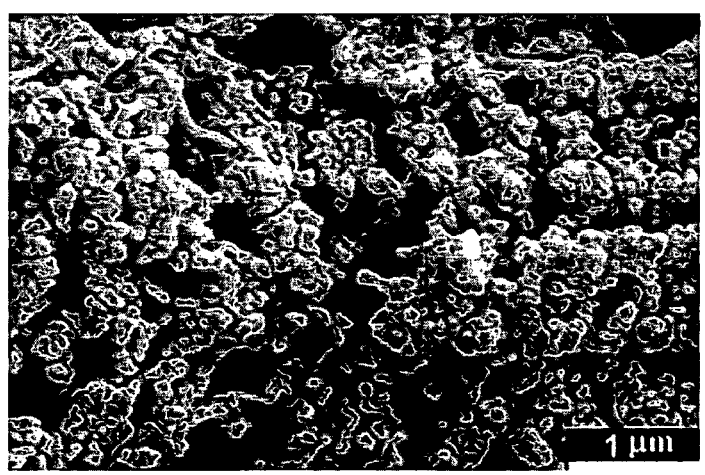

FIGS. 3 and 4 are TEM images 30, 40 showing the nanostructures of the composite electrodes prepared through EPD. The TEM image 40 is scaled to 1.0 μm. Both TEM images 30, 40 show composite cathode films composed of MWNTs and $LiCoO_2$ nanoparticles respectively in the $LiCoO_2$/MWNTs composite 15 wt % and 10 wt % concentrations. When the fraction of MWNTs in the composite electrode is appropriately 15 wt %, the MWNTs tend to serve as a template for assembling the nanoparticles and an ordered structured can be obtained. However, when the fraction of MWNTs in the composite electrode is approximately 10 wt %, the ordered degree decreases. Ordered structures tend to form in samples with higher concentrations of CNTs due to more available surfaces upon which nanoparticles can attach. Furthermore, CNTs migrate faster than nanoparticles during EPD and serve as nanoelectrodes for depositing nanoparticles onto the EPD electrodes. When the concentration of CNTs in the stable suspension is lower, the nanoparticles tend to deposit directly onto the EPD electrodes to form a film upon which CNTs and nanoparticles mix together in a regular way.

Example 2

Electrolyte deposition (ELD) also is a colloidal process that forms thin films from solutions of metal salts in electrode reactions. In one embodiment, to prepare an amorphous $MnO_2$ (a-$MnO_2$) composite electrode, functionalized MWNTs are suspended in manganese salt-containing solvent. The presence of functional groups on the walls of the functionalized MWNTs allows $Mn_2+$ ions to be easily absorbed. In a typical experiment, a colloidal suspension of MWNTs in DMF at a concentration of 5 mg/ml is prepared and about 30 mg of $Mn(NO_3)_2 \cdot 6H_2O$ is added. For electrochemical measurement, a 1M $Na_2SO_4$ aqueous solution is used as the electrolyte. The suspension is sonicated for about 30 minutes. The composite electrodes are prepared by directly depositing 0.10 ml of the colloidal suspension on nickel foils and dried at room temperature. After drying, the electrodes are heated to 250° C. in a furnace at a heating rate of 5° C./min and held at 250° C. for about 30 minutes. During the heating process, $Mn(NO_3)_2$ is released as a gas and amorphous $MnO_2$ results.

Figure 5A:
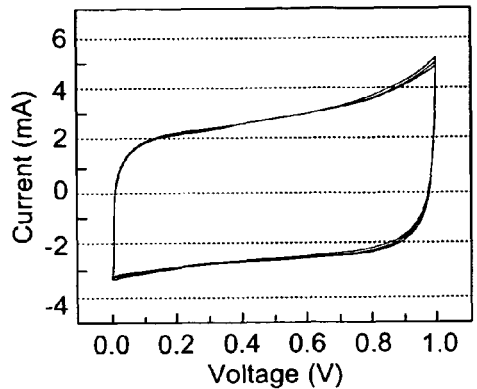
FIGS. 5A-B are graphs showing cyclic voltammograms of composite electrodes.
Figure 5B:
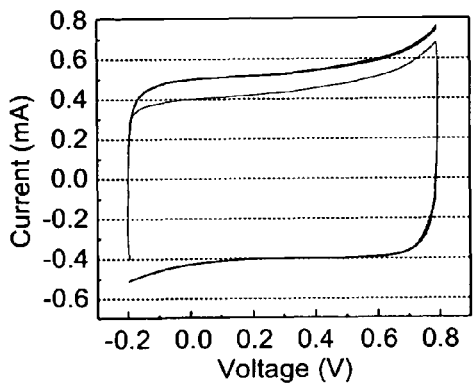

FIGS. 5A-B are graphs showing cyclic voltammograms 50, 60 of composite electrodes. The x-axis represents voltage. The y-axis represents current in milliamps (mAmps). The cyclic voltammograms 50, 60 are captured at a scan rate of 50 mV/s for the ultracapacitors. Referring first to FIG. 5A, an ultracapacitor with a composite electrode composed of $MnO_2$ is shown. The active material in the composite electrode is about 1.4 mg, including about 0.5 mg of CNTs and about 0.9 mg of $MnO_2$ nanotubes. Referring next to FIG. 5B, an ultracapacitor with an electrode composed of pure CNTs is shown. The active material in the electrode is about 0.5 mg of CNTs. The current produced by the composite electrode ultracapacitor is significantly larger than the current produced by the pure CNTs electrode ultracapacitors. The capacitance of the composite electrode ultracapacitor, about 46 F/g, is approximately twice the capacitance of the pure CNTs electrode ultracapacitor, about 20 F/g.

Figure 6A:
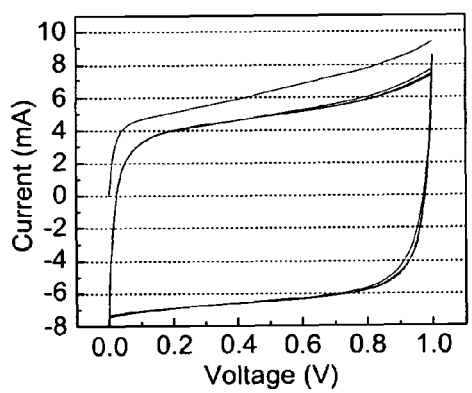
FIGS. 6A-B are graphs showing cyclic voltammograms for ultracapacitors.
Figure 6B:
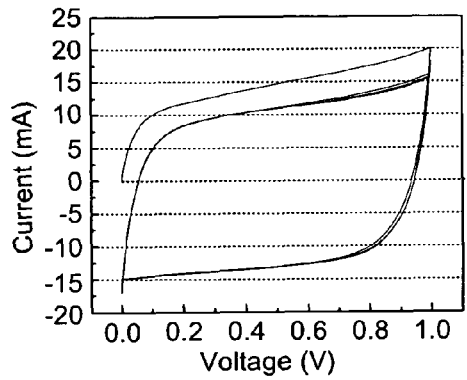

FIGS. 6A-B are graphs showing cyclic voltammograms 70, 80 for ultracapacitors. The cyclic voltammograms 70, 80 were respectively captured at scan rates of 100 mV/s and 250 mV/s for ultracapacitors with composite electrodes composed of $MnO_2$. The CV shapes of both ultracapacitors are still close to a rectangular shape, even when captured at a high scan rate and a maximum power density of about 20-25 kW/kg can be obtained.

Figure 7:
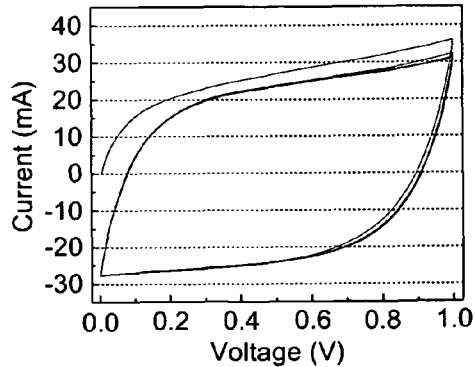
FIGS. 7 and 8 are graphs showing cyclic voltammograms of a composite electrode.
Figure 8:
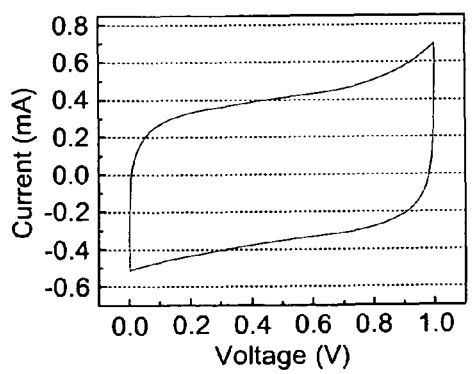

Finally, FIGS. 7 and 8 are graphs showing cyclic voltammograms 90, 100 of a composite electrode. The cyclic voltammograms 90, 100 were respectively captured at scan rates of 500 Mv/s and 5 Mv/s for an ultracapacitor with composite electrodes composed of $MnO_2$. A capacitance of about 70 F/g can be obtained if calculated at a lower scan rate, such as shown with reference to FIG. 8.

Example 3

Composite electrodes composed of a-$MnO_2$ for ultracapacitors can also be prepared via combined EPD and ELD. Functionalized MWNTs are negatively charged and can be easily charged with cations when added into a solution of metal salt. In a typical experiment, 4.5 mg of functionalized MWNTs are dispersed in 60 ml of ethanol by ultrasonication and 10 mg of $Mn(NO_3)_2$ are added into the suspension as an electrolyte.

Empirically, the resultant film formed by MWNT deposition on the electrodes exhibits strong adhesion and no binder is necessary. Since the MWNTs in the bottommost deposit layer is in direct electrical contact with the electrode current collector, direct electrical paths from the electrode materials to the current collector are available and contact resistance, as well as internal resistance, is minimal.

Further Embodiments

In addition to electrode conductors composed of pure MWNTs, in a further embodiment, a mixture of carbon nanotubes and carbon black particles could be engaged by varying the volume percent of carbon nanotubes.

In addition, in a still further embodiment, water or other organic solvent, can be used to prepare the suspension of carbon nanotubes rather than ethanol.

In addition, in a still further embodiment, other nitrates can be used as an electrolyte to charge nanoparticles and nanotubes during EPD rather than $Mg(NO_3)_2$.

Moreover, the active sites for Faradic reactions can be extended to areas around the contact points in composite electrodes. Electrons flow from the contact point between the MWNTs and the surface of the active nanoparticles to take part in a Faradic reaction. Therefore, larger capacitance for ultracapacitors or energy or power capacity for lithium-ion batteries can be obtained from composite electrodes.

Similarly, the composite electrodes formed by colloidal techniques, such as EPD, ELD, or direct deposition, exhibit strong adhesion to the electrode, for instance, when used as a capacitor current collector, and no binder is necessary. Since the MWNTs in the bottommost deposit layer of the MWNT and nanoparticle film is directly connected to the current collector, contact resistance and internal resistance are minimal, resulting in improved capacitor power density and lithium-ion battery rate capability.

While the invention has been particularly shown and described as referenced to the embodiments thereof, those skilled in the art will understand that the foregoing and other changes in form and detail may be made therein without departing from the spirit and scope of the invention.

What is claimed is:

1. A method for preparing a nanostructured composite electrode through electrophoretic deposition, comprising:
   suspending a conductive material comprising functionalized carbon multi-walled nanotubes and an active material comprising synthesized nanoparticles into a stable suspension in solution by ultrasonication;
   applying a surface charge to the active material by adding an electrolyte into the stable suspension;
   introducing at least two electrodes comprising conductive metal foils into the stable suspension in opposing parallel orientation; and
   forming a direct current electrical field between the electrodes sufficient to cause conductive material and the active material formation thereupon.

2. A method according to claim 1, further comprising:
   orienting at least one of the electrodes superposed relative to the other electrodes to facilitate upward deposition of the conductive material and the active material.

3. A method according to claim 1, wherein the direct current electrical field is formed by applying a direct current voltage between 20-45 volts and a current between 60-80 mAmps.

4. A method according to claim 1, wherein the fraction of the carbon multi-walled nanotubes comprises between 10 wt % and 15 wt %.

5. A method according to claim 1, wherein the electrolyte comprises a compound selected from the group comprising $Mg(NO_3)_2$ of between $10^{-5}$ and $10^{-4}$ mol.

6. A method according to claim 1, wherein the conductive metal foils are selected from the group comprising nickel, aluminum, or copper.

7. A method according to claim 1, further comprising:
   dissolving an alkali metal and a transition metal into an aqueous citrate acid solution;
   evaporating water from the dissolved solution; and
   forming the synthesized nanoparticles through auto-ignited combustion and annealing.

8. A method according to claim 7, wherein the synthesized nanoparticles comprise a compound selected from the group comprising $LiCoO_2$, $LiMnO_2$, $LiNiO_2$, and $Li_xMn_{1-y}Ni_yO_2$.

9. A method according to claim 7, wherein the synthesized nanoparticles comprise a compound selected from the group comprising manganese dioxide and ruthenium dioxide.

10. A method according to claim 7, wherein the synthesized nanoparticles comprise a compound selected from the group comprising platinum and ruthenium.

11. A method according to claim 7, wherein the annealing is provided at approximately 500° C. for about three hours.

12. A method for preparing a nanostructured composite electrode through direct deposition, comprising:
    suspending a conductive material comprising functionalized carbon multi-walled nanotubes and an active material into a colloidal suspension in manganese salt-containing solvent by ultrasonication;
    directly depositing a layer of the colloidal suspension on at least one electrode comprising a conductive metal foil followed by drying; and
    annealing the electrode to decompose the colloidal suspension into an amorphous deposit comprising synthesized nanoparticles.

13. A method according to claim 12, wherein the annealing is provided at a heating rate of about 5° C./minute and held at approximately 250° C. for about 30 minutes.

14. A method according to claim 12, wherein the active material comprises a compound selected from the group comprising $Mn(NO_3)_2 \cdot 6H_2O$.

15. A method according to claim 12, wherein the synthesized nanoparticles comprise a compound selected from the group comprising amorphous $MnO_2$.

16. A method for preparing a nanostructured composite electrode through combined electrophoretic and electrolyte deposition, comprising:
    suspending a conductive material comprising functionalized carbon multi-walled nanotubes into a stable suspension in ethanol by ultrasonication;
    adding an electrolyte comprising a metal salt into the stable suspension;
    introducing at least two electrodes comprising conductive metal foils into the stable suspension in parallel orientation; and
    forming a direct current electrical field between the electrodes sufficient to cause conductive material and the active material formation thereupon.

17. A method according to claim 16, further comprising:
    orienting at least one of the electrodes superposed relative to the other electrodes to facilitate upward deposition of the conductive material and the active material.

18. A method according to claim 16, wherein the direct current electrical field is formed by applying a direct current voltage between 20-45 volts and a current between 60-80 mAmps.

19. A method according to claim 16, wherein the fraction of the carbon multi-walled nanotubes comprises between 10 wt % and 15 wt %.

20. A method according to claim 16, wherein the electrolyte comprises a compound selected from the group comprising $Mn(NO_3)_2$.

21. A method according to claim 16, wherein the synthesized nanoparticles comprise a compound selected from the group comprising amorphous $MnO_2$.

22. A method according to claim 16, wherein the conductive metal foils are selected from the group comprising nickel, aluminum, or copper.

* * * * *